United States Patent

[11] 3,593,256

[72] Inventor Edmund C. Gannon
  Waterford, Conn.
[21] Appl. No. 868,369
[22] Filed Oct. 22, 1969
[45] Patented July 13, 1971
[73] Assignee The United States of America as
  represented by the Secretary of the Navy

[54] DOPPLER CORRECTION TECHNIQUE
  8 Claims, 5 Drawing Figs.
[52] U.S. Cl. .................................................. 340/5 R,
  325/324, 325/474, 340/3 D
[51] Int. Cl. .................................................... H04b 1/10
[50] Field of Search ........................................ 340/3 D, 5,
  6; 325/473—475, 477, 323—324; 343/5

[56] References Cited
  UNITED STATES PATENTS
  3,325,736  6/1967  Waetjen ..................... 325/473 X
  3,341,808  9/1967  Levin et al. ................. 340/5

Primary Examiner—Richard A. Farley
Attorneys—Richard S. Sciascia, Louis B. Applebaum and Philip Schneider ABSTRACT: Method and means for complete correction of Doppler shift in a transmitted spectrum of individual frequencies, or tones, constituting a multitone, coded pulse system in which the lowest (reference) and highest frequencies and the bandwidth are known and enclose an information band of frequencies. The upper and lower half-bands of the received signal are filtered out and mixed to provide the difference frequencies, one of which is a unique frequency corresponding to the spectrum bandwidth. This is filtered out and multiplied by a fixed factor to provide the zero-Doppler reference frequency. The latter is mixed with the information band, which has been filtered from the input signal, and the result is a signal which comprises the information band Doppler-corrected for the reference frequency. The signal corresponding to the spectrum bandwidth is also sent through means which senses the amount of Doppler-shift it has undergone, selects an inverse multiplying factor in accordance with this amount of shift and multiplies the reference-frequency-corrected information band, thereby correcting it for the Doppler-stretch the received information band has undergone. The information band is now completely Doppler-corrected and is divided by a zero-Doppler correction factor to correct the spectral spread introduced by the previous multiplication by said inverse multiplying factor.

$f_r$ = REFERENCE FREQUENCY
$f_o$ = UPPER-LIMIT FREQUENCY
$\Delta f = f_o - f_r$

DOPPLER CORRECTION TECHNIQUE

The invention described herein may be manufactured and used by or for the Government of the United States of America for governmental purposes without the payment of any royalties thereon or therefor.

This invention relates to a method and means for correcting Doppler shift in coded-pulse communications systems and especially in underseas acoustic coded-pulse communications systems.

Much time and effort have been spent in attempting to develop long-range, underseas, acoustic communications systems. Doppler shifts in these systems have hitherto been corrected by performing a modulation to shift a band of received frequencies back to a near-zero Doppler condition. This shift is perfect at only one frequency while all other frequencies in the band have proportional errors. Thus, all frequencies in the band can be measured only to the tolerance governed by the error remaining after the Doppler correction has been made. For one frequency, the error is zero; for all other frequencies, the error increases proportionally as the measured frequency moves away from the corrected frequency. When the measured frequency or frequencies reach a point where the error becomes intolerable, a second point of correction in the received spectrum becomes necessary. As one proceeds further along the spectrum, additional corrections become necessary.

This process of corrections has several undesirable effects: (1) the resolution is limited; (2) the use of guard bands between the independently corrected frequency bands is required causing excessive overall bandwidth (usually at a premium); (3) the signal-to-noise ratio is generally reduced because of the necessity of using wider bandwidth filters to detect frequencies not completely Doppler-corrected, thereby reducing useable range.

An object of this invention is to provide a method and means for correcting Doppler shift in communications systems, especially in systems which transmit simultaneous pulses of energy at discrete frequencies over a given frequency band.

The objects and advantages of the present invention are accomplished, in a system in which the zero-Doppler reference frequency and bandwidth are known factors, by a first correction of the received spectrum through which the Doppler-shifted reference frequency is returned to its zero-Doppler value and by a second correction through which the remainder of the transmitted spectrum is multiplied by an inverse factor which compensates for the Doppler-induced stretch or compression of bandwidth and returns it to its original zero-Doppler state.

Other objects, advantages and novel features of the invention will become apparent from the following detailed description of the invention when considered in conjunction with the accompanying drawings wherein.

The communication system with respect to which the present invention will be described is an underwater acoustic system in which the information is presented by a series of simultaneously transmitted tones, each of a different frequency. The tones are transmitted for a predetermined period and, after an interval, another set of tones is transmitted. Each set of simultaneously transmitted tones may represent a letter of the alphabet, for example.

Figure 1:
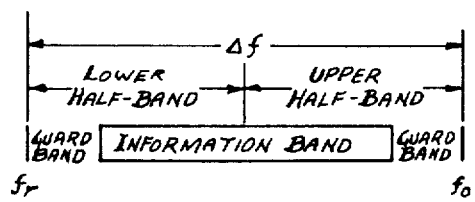
FIG. 1 is a schematic diagram showing the basic transmitted frequency spectrum of the communication system.

The number of tones which may be transmitted is predetermined; that is a fixed number of frequency slots (which may be about 0.5 Hz. wide, for example) exist in the information band of the basic frequency spectrum (see FIG. 1) of the transmitter. The frequencies, or tones, which fit into these slots may be transmitted in any combination—thus, for example, if there are eight frequency slots, one transmission might consist of tones in slots 1, 3 and 8 and the next might consist of tones in slots 2, 3 and 6. This system can be called a multitone, coded pulse system. (Strictly speaking, the tones which are transmitted in the undersea medium are too long in duration to be pulses. However, they will be designated "pulses" herein.)

Reception of such signals is accomplished by a receiver which employs a set of adjacent narrowband filters to filter out the particular tones which were transmitted. However, if the transmitting platform and receiving platform are moving relative to each other, the Doppler effect introduces frequency shifts in the received tones, which may be sufficient to cause some or all of the tones to be processed through the wrong filters. The receiver then prints out a letter which is different from the one which was transmitted. Thus, it is necessary either to increase the bandwidth of the filters or to correct the Doppler shift. Since the undersea medium and the electroacoustic equipment now available impose bandwidth limitations, the ability to correct Doppler shift becomes very important.

The principle of this invention is based on the premise that the Doppler shift at any frequency can be considered linear with velocity. This assumption is valid for underwater acoustics, since present platform speeds generally involve a relative velocity of no more than 60 knots and usually involve considerably smaller velocities in order to maintain a reasonable receiver self-noise level.

To implement the principle of the invention, the receiver must know two things about the received signal:

1. The zero-Doppler reference frequency, $f_r$;
2. The zero-Doppler bandwidth, or frequency difference, $\Delta f$.

Thus, in addition to the information band the transmitted signal includes two other tones—the reference frequency, $f_r$, which is lower than the information tones, and a zero-Doppler, spectrum upper-limit frequency, $f_o$, which is higher than the information tones. The spectrum bandwidth, or frequency difference, $\Delta f$, is then known and equal to $f_o - f_r$. The mechanization of this format is simplified if the reference frequency is some integral multiple of the frequency difference, so that $f_r = M(\Delta f)$ where M is a known integral or fixed factor, which can be called the reference-frequency factor. Making the reference frequency, $f_r$, a known multiple of the frequency difference, $\Delta f$, simplifies the problem of internally generating a reference locked to that in the water. The internal generation of a reference is necessary in order to avoid effects of amplitude variation in the modulators which use this reference.

Figure 2:
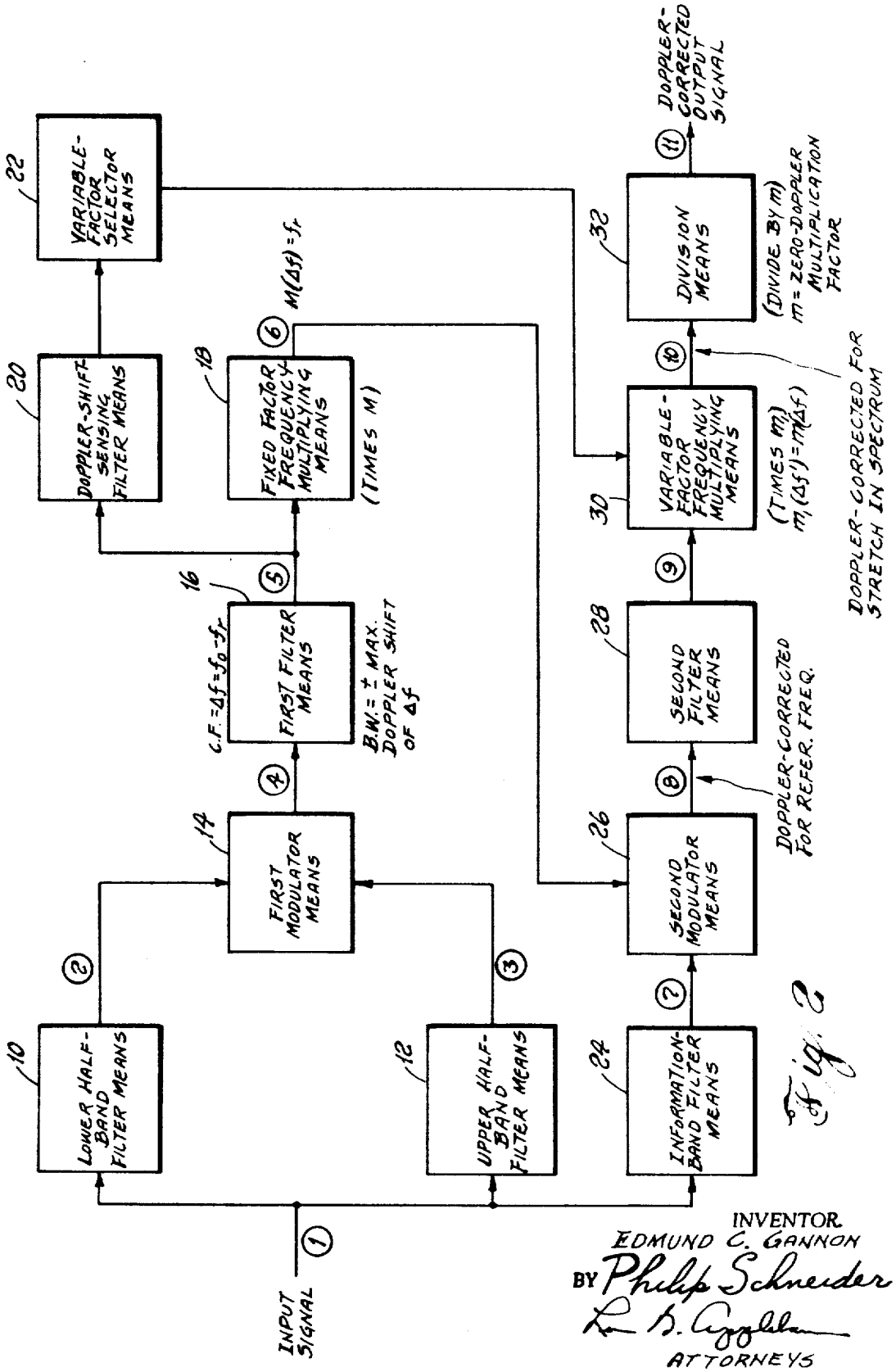
FIG. 2 is a block diagram of an embodiment of the invention.
Figure 3:
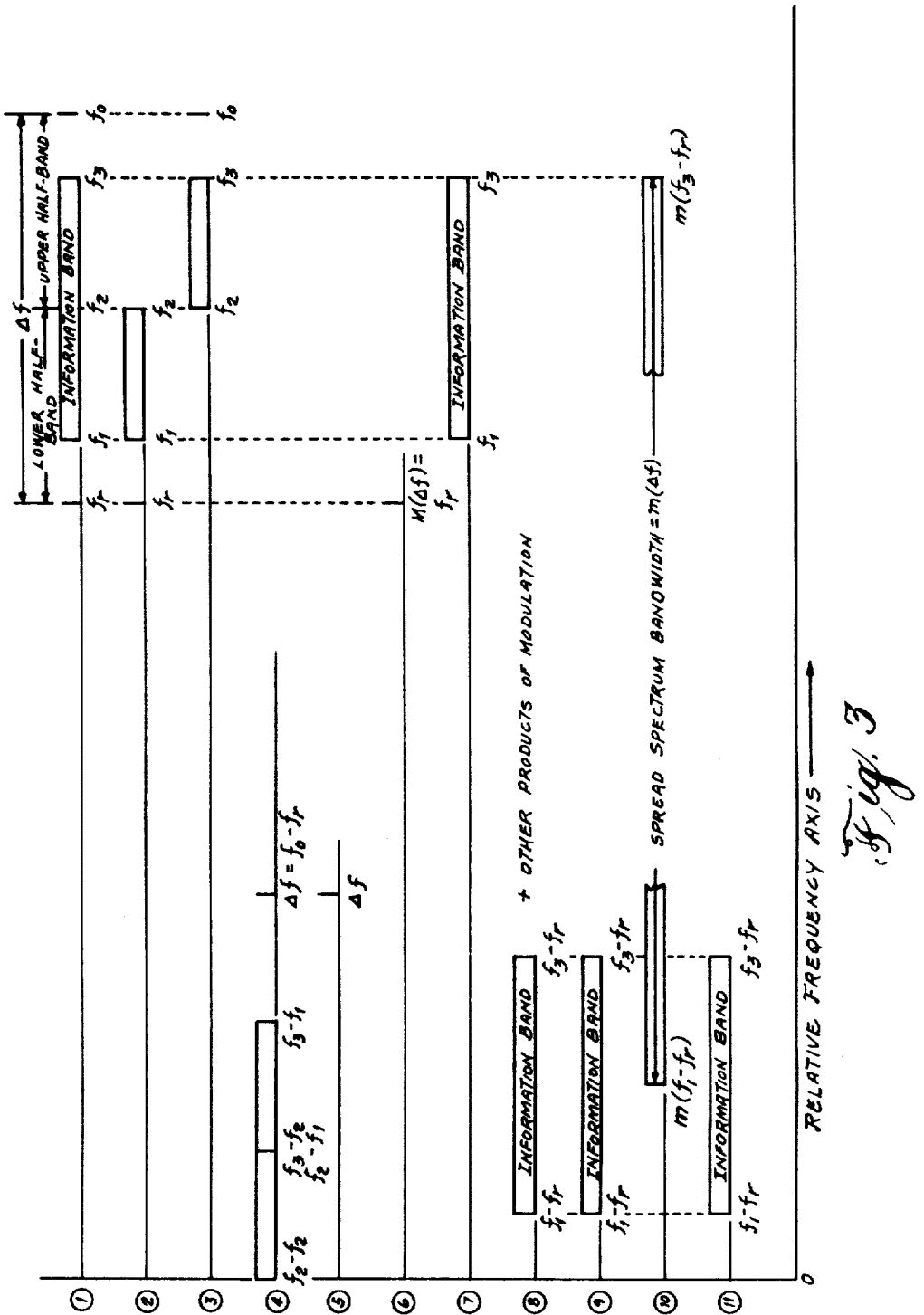
FIG. 3 is a schematic diagram showing, for the zero-Doppler case, the signal spectrum as it exists at various points in the circuit shown in FIG. 2.

The transmitted spectrum is considered to be divided into two halves, the lower half-band and the upper half-band. Referring to FIGS. 2 and 3, the invention will first be explained with respect to a spectrum which has no Doppler shift. The input signal ① is fed into filter means 10 and 12 which separate the input signal spectrum into a lower half-band ② and an upper half-band ③. These half-band signals are fed into first modulator means 14 which provides an output ④ comprising the difference frequencies of its input signals ② and ③. Note that the highest frequency obtained is a discrete and unique frequency corresponding to the bandwidth of the transmitted spectrum, $\Delta f$.

The output of the first modulator means 14 is coupled into a first filter means 16 which may comprise a band-pass filter having a center frequency equal to $\Delta f$ and a bandwidth equal, on either side of the center frequency, to the maximum Doppler shift to be expected in view of the maximum possible relative platform velocity. The output ⑤ of the first filter means 16 is then a frequency $\Delta f$.

The output ⑥ of the first filter means 16 is fed to a fixed-factor frequency-multiplying means 18 which has a fixed, predetermined multiplying factor, M, (the reference-frequency factor) in accordance with the formula, $M(\Delta f)=f_r$. Thus, the output ⑥ of this stage is the reference frequency, $f_r$ as received.

The input signal ① is also coupled to the information-band filter means 24 which filters the signal to provide an output ⑦ comprising only the information band frequencies, $f_1$ to $f_3$. This signal ⑦ and the reference frequency, $f_r$, from the fixed-factor frequency-multiplying means 18 are combined in a second modulator means 26. The lower sideband is then selected by second filter means 28, providing in effect a downshifting of the information band so that it now starts from a frequency $f_1-f_r$, ends at a frequency $f_3-f_r$. The frequency $f_r$ in the input spectrum at ⑦, when combined with the signal ⑥ in the second modulator means 26, becomes zero Hertz in waveform ⑧ which signifies 100 percent Doppler correction.

Figure 4:
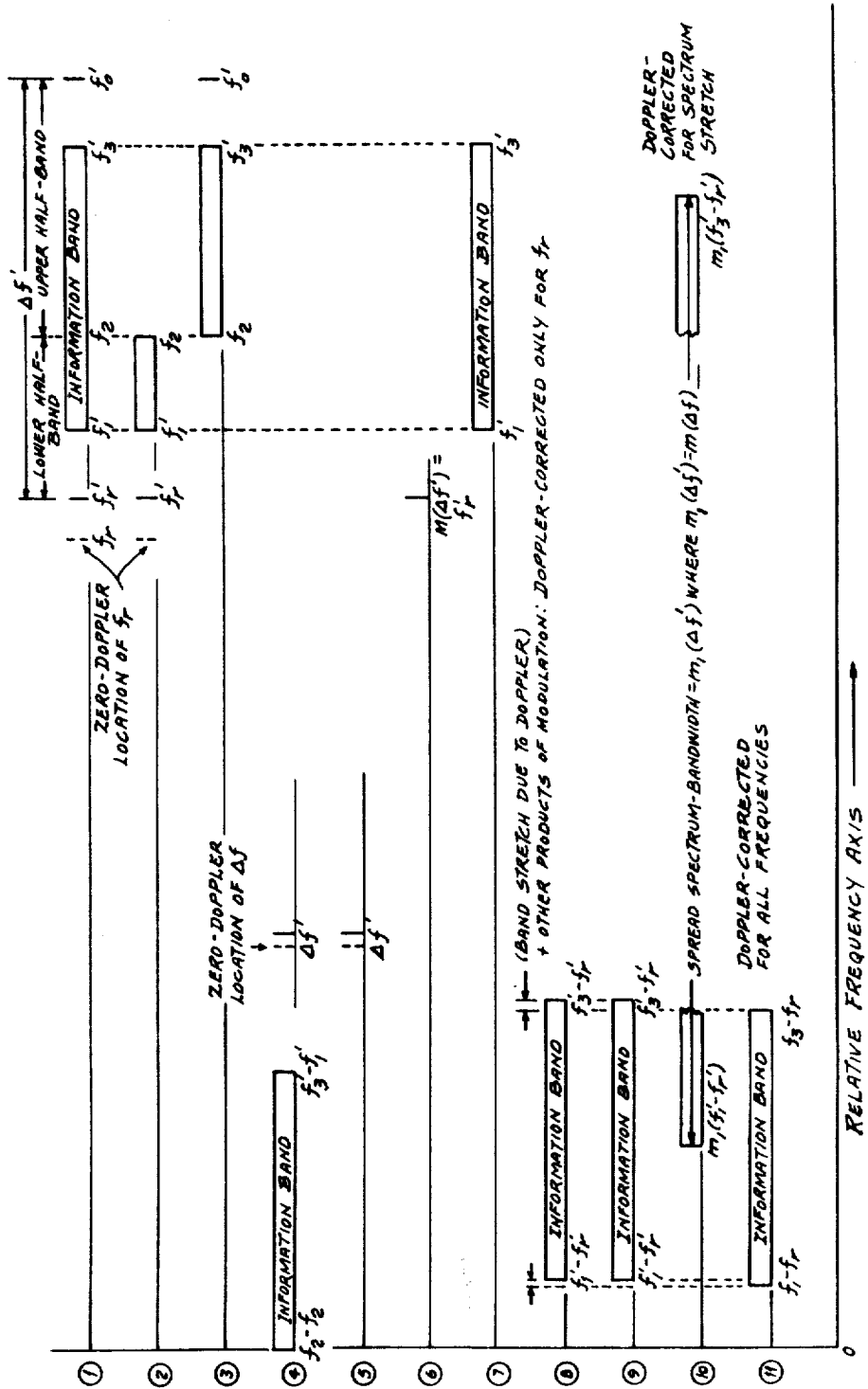
FIG. 4 is a schematic diagram showing, for the Doppler-shift case, the signal spectrum as it exists at various points in the circuit shown in FIG. 2.

The remaining components of the circuit will be explained with the assumption that an up-Doppler shift has occurred during the transmission of the signal through the medium. Referring to FIG. 4, it is apparent that the Doppler effect shifts the frequencies upward and stretches them out. Looking at waveforms ①, ② and ③, the zero-Doppler location of the reference frequency, $f_r$, has been shifted to a new location, $f_r'$. The stretch of the individual frequencies is apparent by comparing the lengths of the information band in FIGS. 3 and 4, or the bandwidths—thus, $(f_3'-f_1')>(f_3-f_1)$ and $\Delta f'>\Delta f$.

The output ⑤ of the first filter means 16 is now a frequency, or tone, equal to $\Delta f'$, the Doppler-shifted bandwidth. When multiplied by the fixed reference-frequency multiplication factor, M, a frequency, $f_r'$, the Doppler-shifted reference frequency is obtained at point ⑥.

Modulating the Doppler-shifted reference frequency, $f_r'$, with the Doppler-shifted information band ⑦ in the second modulator means 26 and filtering the output for the lower sideband brings the information band down in frequency so that its starting frequency is $(f_1'-f_r')$ and its upper-limit frequency is $(f_3'-f_r')$. It should be noted that, at this point, the signal is 100 percent Doppler corrected for the reference frequency, $f_r$—that is, if $f_r'$ were included in waveform ⑦ in FIG. 4 and $f_r$ were included in waveform ⑦ in FIG. 3, the modulation process would bring $f_r'-f_r'$ and $f_r-f_r$ to the same point (the zero point) on the relative frequency axis in both figures. Stating this another way, the reinsertion of the reference frequency and its modulation with the information band frequencies permits the reference frequency to be 100 percent Doppler-corrected in all further manipulations of the signal.

The correction of the stretch in the bandwidth is accomplished by feeding the output ⑤ of the first filter means 16 (which is a frequency equal to the Doppler-shifted bandwidth, $\Delta f'$) to the Doppler shift-sensing filter means 20. This filter means 20 comprises a bank or set, of narrow-band filters completely covering the spectrum of frequencies in which $\Delta f'$ can occur in view of the relative platform velocities for which the system is designed. An output is obtained from one of the narrowband filters in this set and is coupled to a frequency-multiplication-factor selection means 22.

In the design of the system, a predetermined value, $m$, is selected as a multiplication factor for the zero-Doppler case. If there is no Doppler shift and the zero-Doppler frequency, $\Delta f_1$ is sensed by the Doppler shift-sensing means 20 and fed to the variable-factor selector means 22, this zero-Doppler multiplication factor, $m$, is selected by the selector means 22 and fed to the variable-factor frequency-multiplying means 30. The output 10 of the latter is seen (FIG. 3) to be a spread spectrum occupying the bandwidth from $m(f_1-f_r)$ to $m(f_3-f_r)$. Division of this spread spectrum in division means 32, which has a fixed division factor, $m$(the zero-Doppler multiplication factor), contracts the spread spectrum to its normal bandwidth, $(f_1-f_r)$ to $(f_3-f_r)$.

This multiplication and division is useless in the zero-Doppler case but very useful in a Doppler-shifted case. The multiplication factor, $m$, which may be called the spectrum stretch-correction factor, has a value which is determined by the equation $m_1(\Delta f')=m(\Delta f)$. The only unknown in this equation is $m_1$. It is evident that $m(\Delta f)$ is fixed value once the system design is set. Therefore, $m_1$ and $\Delta f'$ vary inversely with each other. If there is an up-Doppler-shift, $m_1$ is proportionately decreased below the value of $m$; if there is a down-Doppler-shift, $m_1$ is proportionately increased above the value of $m$. The value of $m_1$ is thus determined by the value found for $\Delta f'$ and compensates for the difference in values between the Doppler-shifted bandwidth, $\Delta f'$, and the zero-Doppler bandwidth, $\Delta f$, so that the equation, $m_1(\Delta f')=m(\Delta f)$, holds true. Thus, the output ⑩ of the variable-factor frequency-multiplying means 30 has the same frequency width as the zero-doppler-shifted case and the spectrum stretch caused by the Doppler-effect has been corrected, although a fixed and invariant spectral spread is now introduced.

The completely corrected, but spread signal ⑩ is then coupled to a division means 32 which divides the signal by the zero-Doppler correction factor, $m_1$ thereby eliminating the spectrum spread and providing the information band frequencies and bandwidth that was generated by the transmitter.

The variable-factor frequency-multiplying means 30 may comprise a delay-line time compressor (DELTIC). Its multiplication factor is very stable and can be varied by a simple lengthening or shortening of the line using shift registers or using a tapped line while simultaneously readjusting the sample rate appropriately.

The division means 32 may comprise a simple array of bistable multivibrators (flip-flops) arranged in a count-down circuit.

The variable-factor selector means 22 may comprise means for controlling the sample period and delay-line length of the DELTIC which factors, in turn, control the multiplying factor.

Figure 5:
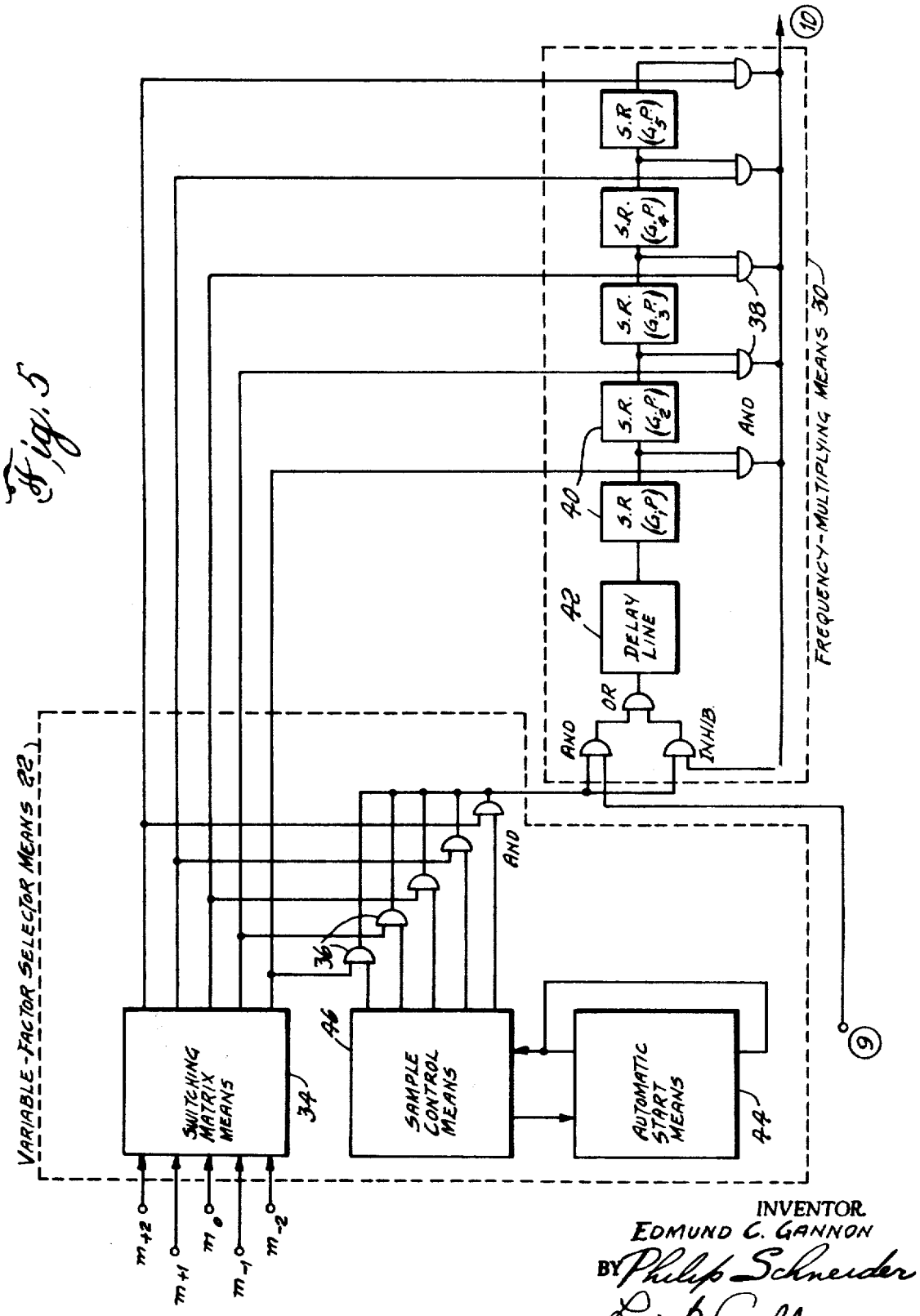
FIG. 5 is a schematic block diagram showing a possible embodiment for the variable-factor selector means and the variable-factor frequency-multiplying means.

Thus, FIG. 5 shows one way of implementing the variable-factor selector means and frequency-multiplying means. Assuming five filters in the Doppler shift-sensing filter means 20, five output signal lines, $m_{12}, m_{11}, m_0, m_{+1}$ and $m_{+2}$, are fed to a switching matrix means 34. The five output lines (corresponding to the input signals) of the switching matrix means 34 are fed to separate AND gates 36 in the five output lines of a sample control means 46 which includes a sample pulse generator, each line being the output channel for a different sampling rate. The sample pulse generator may include a delay line with a set of serial shift registers and a recirculation line, for ample.

The switching matrix means output lines are also connected each to a different one of five AND gates 38 associated with the shift registers 40 of the DELTIC employed as the variable-factor frequency-multiplying means 30. These shift registers 40 are separated into five groups connected in serial fashion and functioning as taps on the delay line 42 so that the combination is a tapped delay line.

Thus, a signal, e.g., $m_{+1}$, from the Doppler shift-sensing filter means 20 is passed through the switching matrix means 34 to the proper sample control AND gate 36 thereby opening it and selecting a sample pulse rate for the pulses to be fed through the DELTIC. At the same time, the $m_{+1}$ signal is fed to the proper shift-register gate 38, thereby opening it and selecting the proper delay time. The sampling rate (or sample period) and delay time selected are the ones which permit the DELTIC to compensate by the correct amount of signal compression or expansion (the correct multiplication factor) for the amount of Doppler shift inherent in the $m_{+1}$ signal.

The switching matrix means 34 in addition to its switching ability has an information storage capacity which remembers the last Doppler-shift signal that has been fed to it and continues to supply this signal in case the input signal is subject to fading, a common occurrence in oceanic sound propagation.

A circuit which is not essential to the concept of the system but is included because of practical considerations is the automatic start means 44. During the initial turn-on or after the DELTIC has been dumped by one of the protective circuits (not shown), it is necessary to clock one pulse into the sample generator to get it started. Basically, this is accomplished by a countdown mechanism synchronized to the clock frequency. The countdown mechanism has a count longer than the longest delay in the sample generator. When the count reaches the end, a pulse is clocked into the sample generator. If the sample is lost or dumped on purpose and the sample generator normalized, the countdown will again proceed to the end of the countdown mechanism and a new pulse will be clocked into the sample generator.

The automatic start function may, for example, be accomplished by four decade counters, two synchronizing circuits, and a gate. The decade counters wired as dividers give a total division of 10,000. The divider is driven by the clocking frequency and is tapped at the output and at the divide-by-1000 point. The output from each tap goes to a pair of AC flip-flops. Each pair is wired as a synchronizer to reestablish the output pulse in phase with the clocking frequency. This is done to offset any propagation delay built up by the countdown mechanism. The outputs of both synchronizer circuits is fed to an AND gate in the serial memory of the sample generator. Ten pulses are fed into the gate from the divide-by-1000 tap for every pulse from the divide-by-10,000 tap. The division ratios are for a particular embodiment and are dictated by the design criteria of that embodiment. If the design criteria are changed, the division ratios can be altered accordingly. However, the basic operation would be the same.

Reset of the countdown mechanism is accomplished by having the recirculating pulse in the sample generator trigger the common reset line on all of the countdown decades once every recirculation. If a pulse somehow gets lost, the countdown proceeds beyond the reset period and reclocks a pulse into the sample generator.

I claim:

1. A method for correcting Doppler-shift effects in a transmitted signal spectrum consisting of plurality of tones of discrete frequency including a zero-Doppler reference frequency, a zero-Doppler upper-limit frequency and a variable set of information band frequencies enclosed therebetween, the enclosing frequencies and the frequency difference between them, or bandwidth, being known, said reference frequency being an integral number (M) times the bandwidth, said method comprising the steps of:

separating the received signal into an upper and lower half-band;

mixing the half-band signals together to obtain the difference frequencies, one of which is a frequency which has the same value as the Doppler-shifted bandwidth;

filtering out the Doppler-shifted bandwidth frequency;

multiplying the bandwidth frequency by said integral number, M, to obtain the Doppler-shifted reference frequency;

sensing the amount of Doppler-shift in the bandwidth frequency and obtaining a variable multiplying factor which is in inverse ratio to the amount of Doppler-shift;

filtering out of the received signal the Doppler-shifted information band frequencies;

mixing said information band frequencies with said Doppler-shifted reference frequency and filtering the resultant signal to obtain a new set of information band frequencies Doppler-corrected for the reference frequency; and multiplying the new set of information band frequencies by said variable multiplying factor to obtain a set of information band frequencies which is completely Doppler-corrected but has a spectrum spread.

2. A method as in claim 1, further including the step of:

dividing by said zero-Doppler multiplication factor said completely corrected set of information band frequencies to correct the spectrum spread.

3. A method for correcting Doppler-shift effects in a transmitted signal spectrum consisting of a plurality of tones of discrete frequency including a zero-Doppler reference frequency $(f_r)$, a zero-Doppler upper-limit frequency $(f_o)$ and a variable set of information band frequencies enclosed therebetween, the enclosing frequencies being known and therefore the zero-Doppler bandwidth, $\Delta f = f_o - f_r$, being known, said reference frequency being a known integral number (M) times the bandwidth, namely, $f_r = M (\Delta f)$, said method comprising the steps of:

separating the received signal into an upper and a lower half-band;

mixing the half-band signals together to obtain the difference frequencies, one of which is a tone having a frequency, $\Delta f'$, the same value as the Doppler-shifted bandwidth;

filtering out the Doppler-shifted bandwidth frequency;

multiplying the bandwidth frequency by said integral number, M, to obtain the Doppler-shifted reference frequency, $f_r'$;

sensing the amount of Doppler-shift in the bandwidth frequency and obtaining a variable multiplying factor, m, which is in inverse ratio to the amount of Doppler-shift and is in accordance with the formula $m_1 (\Delta f') = m (\Delta f)$, where m is a preselected zero-Doppler multiplication factor;

filtering out of the original received signal the Doppler-shifted information band frequencies;

mixing said information band frequencies with said reference frequency and filtering the resultant signal to obtain a new set of information band frequencies Doppler-corrected for the reference frequency; and multiplying the new set of information band frequencies by said variable multiplying factor, $m_1$, to obtain a set of information band frequencies which is completely Doppler-corrected but has a spectrum spread.

4. A method as in claim 3, further including the step of:

dividing by said zero-Doppler multiplication factor, m, said completely corrected set of information band frequencies to correct the spectrum spread.

5. A means for correcting Doppler-shift effects in a transmitted signal spectrum consisting of a plurality of tones of discrete frequency including a zero-Doppler reference frequency, a zero-Doppler upper-limit frequency and a variable set of information band frequencies enclosed therebetween, the enclosing frequencies and the frequency difference between them, or bandwidth, being known, said reference frequency being an integral number (M) times the bandwidth, said means comprising the steps of:

means for separating the received signal into an upper and a lower half-band;

means for mixing the half-band signals together to obtain the difference frequencies, one of which is a frequency which has the same value as the Doppler-shifted bandwidth;

means for filtering out the Doppler-shifted bandwidth frequency, the bandwidth of said filtering means being approximately equal to plus or minus the maximum expected Doppler shift of the transmitted singal's zero-Doppler bandwidth and the center frequency being equal to said zero-Doppler bandwidth;

means for multiplying the bandwidth frequency by said integral number, M, to obtain the Doppler-shifted reference frequency;

means for sensing the amount of Doppler-shift in the bandwidth frequency and obtaining a variable multiplying factor which is in inverse ratio to the amount of Doppler-shift;

means for filtering out of the received signal the Doppler-shifted information band frequencies;

means for mixing said information band frequencies with said Doppler-shifted reference frequency and filtering the resultant signal to obtain a new set of information band frequencies Doppler-corrected for the reference frequency; and means for multiplying the new set of information band frequencies by said variable multiplying factor to obtain a set of information band frequencies which is completely Doppler-corrected but has a spectrum spread.

6. A means as in claim 5, further including:

means for dividing by said zero-Doppler multiplication factor said completely corrected set of information band frequencies to correct the spectrum spread.

7. A means for correcting Doppler-shift effects in a transmitted signal spectrum consisting of a plurality of tones of discrete frequency including a zero-Doppler reference frequency ($f_r$), a zero-Doppler upper-limit frequency ($f_o$) and a variable set of information band frequencies enclosed therebetween, the enclosing frequencies being known and therefore the zero-Doppler bandwidth, $\Delta f = f_o - f_r$, being known, said reference frequency being a known integral number (M) times the bandwidth, namely, $f_r = M(\Delta f)$, said means comprising the steps of:

means for separating the received signal into an upper and a lower half-band;

means for mixing the half-band signals together to obtain the difference frequencies, one of which is a tone having a frequency, $\Delta f'$, the same value as the Doppler-shifted bandwidth;

means for filtering out the Doppler-shifted bandwidth frequency, the center frequency of said filtering means being equal to $\Delta f$, and the bandwidth of said filtering means being equal to ± maximum expected Doppler-shift of $\Delta f$, that is, $\pm (\Delta f'_{max} - \Delta f)$;

means for multiplying the bandwidth frequency by said integral number, M, to obtain the Doppler-shifted reference frequency, $f_r'$;

means for sensing the amount of Doppler-shift in the bandwidth frequency and obtaining a variable multiplying factor, $m$, which is in inverse ratio to the amount of Doppler-shift and is in accordance with the formula $m_1 (\Delta f') = m (\Delta f)$, where $m$ is a preselected zero-Doppler multiplication factor;

means for filtering out of the original received signal the Doppler-shifted information band frequencies;

means for mixing said information band frequencies with said reference frequency and filtering the resultant signal to obtain a new set of information band frequencies Doppler-corrected for the reference frequency; and means for multiplying the new set of information band frequencies by said variable multiplying factor, $m_1$, to obtain a set of information band frequencies which is completely Doppler-corrected but has a spectrum spread.

8. A means as in claim 7, further including:

means for dividing by said zero-Doppler multiplication factor, $m$, said completely corrected set of information band frequencies to correct the spectrum spread.